2,848,257

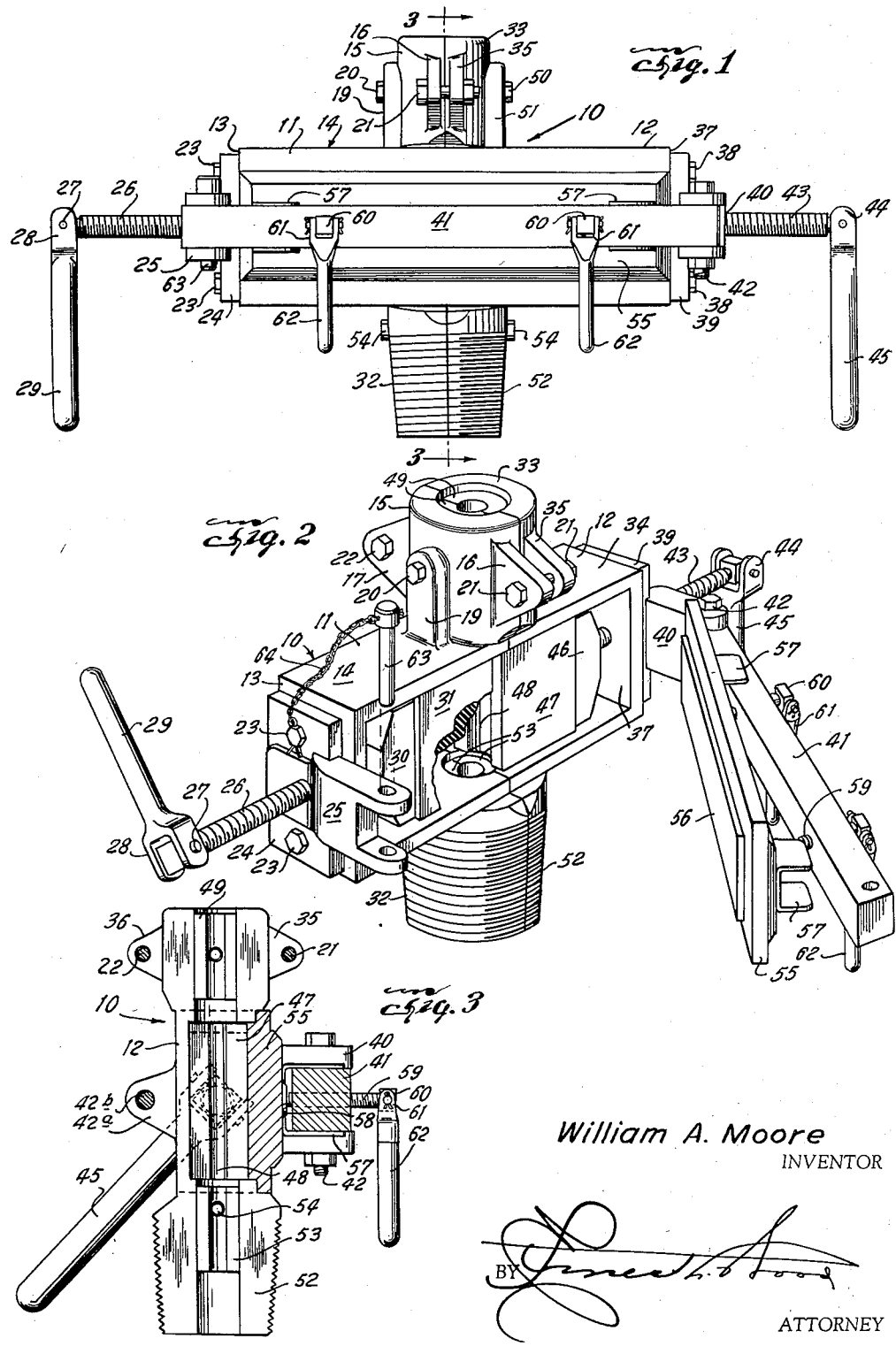

WIRE LINE OIL SAVER

William A. Moore, Dallas, Tex.

Application July 19, 1954, Serial No. 444,123

6 Claims. (Cl. 286—16)

This invention relates to well pumping equipment and more particularly to oil savers or stuffing boxes for use on polished rods or cables in pumping wells.

The principal object of the invention is to improve upon the old and well known types of oil savers or stuffing boxes wherein rubber packing elements are inserted into and removed from the stuffing box at its ends. While this mode of adaptation of packers has met with fair success, it has at least one outstanding fault which has plagued operators for many years. This deficiency lies in the inaccessibility of the packing elements except through the breach or ends of the stuffing box or by removing the box, which is usually made up of separable sections, from the rod or cable, as the case may be. It frequently happens that the packing elements are lacerated by the cable or otherwise damaged to the extent that the packing elements or fragments thereof ball up in the box and it is a time consuming operation to extract the damaged or worn packers from the stuffing box.

It is, therefore, the chief object of the invention to provide a stuffing box or oil saver which is so designed and constructed that the packing elements or blocks are inserted into or removed from the box from the side of the latter which is open from end to end and closed by means of a hinged door, thus making possible speedy replacement of packers which have become worn or shredded by the cable passing therebetween.

Another object of the invention is to provide an oil saver consisting of an elongate box in separable sections adapted to be bolted together about a pump rod or cable, one of the sections having hinged thereto a door or closure which is coextensive with the assembled box sections and latchable opposite its hinge to the other section. A latch bar traverses the closure longitudinally and constitutes a part of the closure hinge and latch and is provided with longitudinally spaced pressure screws by means of which pressure is imposed on the packing elements through the medium of the closure to insure against leakage of liquid through the side opening of the box.

Another object of the invention is to provide followers for the outer ends of the packing elements and screws for advancing the followers against the packing elements to bring the confronting ends of the latter into sealing engagement with the pump rod or line.

Other objects will appear as the description proceeds when considered with the annexed drawing, wherein:

Figure 1 is a front elevational view of an oil saver or stuffing box constructed according to the invention.

Figure 2 is a front perspective view with the closure in open position, and

Figure 3 is a view taken on line 3—3 of Figure 1 with parts in cross-section.

Continuing with a more detailed description of the drawing, reference numeral 10 denotes generally the housing or stuffing box which is made up of complementary sections 11 and 12.

Box section 11 is preferably cast or molded and has a closed end 13, opposite which is an open end, as shown in Figure 2 and an open front. Formed integrally with the top 14 of section 11 is a semi-cylindrical member 15 on which is formed a forwardly directed ear 16 and a rearwardly directed ear 17, the ears 16 and 17 being diametrically opposed. Also formed on the member 15, perpendicular to and integral with the top 14 of the section 11 is an elongate boss 19. The boss 19, ears 16 and 17 are each apertured to receive bolts 20, 21 and 22, respectively, to which further reference will be made presently.

Attached by means of bolts 23 to the end 13 of the box section 11 is a plate 24. Formed integrally with the plate is a forwardly extending and bifurcated latch element 25. The plate 24 and end 13 are tapped and threaded to receive a threaded bolt 26, the outer end of which is pivotally attached at 27 to the bifurcated end 28 of a handle 29 which serves to rotate the bolt 26 to advance a follower 30 (Figure 2) against a rubber packing element 31 which is conformably and slidably disposed in the section 11 of the box 10.

Formed integrally with the bottom of the box section 11 is a semi-cylindrical member 32 which is tapered and exteriorly threaded and is axially aligned with the semi-cylindrical element 15 formed on the top of the box section 11.

The box section 12 is almost identical in form to the section 11. The section 12 has a semi-cylindrical element 33 formed on its top 34, having oppositely projecting ears 35 and 36 which are in parallelism with the ears 16 and 17, respectively, and to which they are secured by the bolts 21 and 22, respectively. The section 12 has a closed end 37, an open front forming a continuation of the open front of section 11 and an open end abutting the open end of the section 11. Affixed by bolts 38 to the end 37 of section 12 is a plate 39 having a bifurcated extension 40 thereon which receives an end of the latch bar 41, pivotally held by a pin 42.

The sections 11 and 12 also have ears 42a, one of which is shown in Figure 2, in juxtaposition at the abutting ends of the sections and are joined together by a bolt 42b.

The plate 39 and the end 37 of the section 12 are tapped and threaded to receive a bolt 43, to the outer end of which is pivotally connected the bifurcated end 44 of a handle 45 by which the bolt 43 is rotated to advance a follower 46 against the companion packing member or block 47. The confronting edges of the blocks 31 and 47 are each grooved at 48, the grooves receiving a polished rod or cable, not shown, which reciprocates within the passage defined by the confronting grooves 48.

Within the cylindrical boss defined by the two semi-cylindrical members 15 and 33 are the semi-cylindrical sections 49 of a bronze bushing, the sections of the bushing being held in position by the screws 20 and 50, the latter being threaded through an opening in an elongate boss 51 (Figure 1) formed on the side of the semi-cylindrical element 33 opposite the analogous boss 19 on the companion section 15.

Within the lower semi-cylindrical members 32 and 52, jointly forming the pin by which the stuffing box is mounted on a tubing or casing (not shown) are semi-cylindrical members 53 defining a lower bronze bushing, the sections 53 being held in position by screws 54 extending through the sections 32 and 52 of the mounting pin. The upper and lower bushings formed by the elements 49 and 53, respectively, prevent engagement of the polished rod or cable with adjacent parts of the box itself, thereby preventing wear and possible sparking.

The closure 55 is coextensive with the assembled sections 11 and 12 and has a reduced portion 56 which corresponds in size to the opening formed by the opening fronts of the assembled sections 11 and 12. The closure has longitudinally spaced, U-shaped clips 57 affixed to its outer surface which clampingly engage the bar 41 and by which the closure is secured releasably to the latch bar. Spaced longitudinally on the closure 55 adjacent the clips 57 are bearing plates 58 (Figure 3) against which bear the inner ends of bolts 59 whose heads 60 are pivotally held in the bifurcated ends 61 of handles 62. When the closure plate 55 is disposed over the open front of the box, the free end of the latch bar 41 is engaged in the bifurcated projection 25 of section 11 and is held therein by a pin 63, attached by a chain 64 to one of the screws 23 to prevent its misplacement.

By rotating the bolts 59, pressure is imposed on the closure plate 55 and this pressure, in turn, is applied to the packing blocks 31 and 47 to compress their confronting edges against the polished rod or cable traveling therebetween and thus prevent leakage of oil at the front of the stuffing box.

Certain types of stuffing boxes are constructed with removable end plates to enable the packing elements to be inserted into the box through its open ends. After installation of the packing elements, the end plates are bolted into place and the packing elements at each end of the box are advanced against the pump rod or cable by screws and followers. Frequently, the packing elements are lacerated or balled up in their chambers requiring their removal. This poses a difficult problem since the packing elements must be removed from the end of the box sometimes piece by piece, resulting in a waste of time. In other cases, it becomes necessary to remove the box entirely and dismantle it before the packers can be removed.

The present invention makes possible the complete removal of the rubber packers by the simple expedient of removing the latch pin 63 and swinging the latch bar 41 and with it, the closure 55 to open position, thus to expose both of the packing elements 31 and 47. The remaining portions of these packers may be quickly removed and replaced by new ones without the necessity of detaching any part of the oil saver to become lost or misplaced.

Manifestly, the construction as shown and described is capable of some modification and such modification as may be construed to fall within the scope and meaning of the appended claims is also considered to be within the spirit and intent of the invention.

What is claimed is:

1. In an oil saver, a box comprised of complementary sections, each having one open side and one open end, said sections being secured together with said open ends in abutment about a vertical passage for the reception of a reciprocating member and with said open sides in horizontal alignment to define an elongate opening coextensive with said sections, a packing element in each of said sections on opposite sides of said passage, a closure for said elongate opening, a latch bar, hinged at one end to the closed end of one of said sections and latched at its opposite end to the closed end of the companion section, clips on said closure clampingly engaging said latch bar, spaced apart bolts threadedly extending through said latch bar and engaging said closure, means for rotating said bolts to advance the same against said closure to compress said packing elements and means operable at the closed end of each of said sections for advancing said packing elements into frictional engagement with said reciprocating member.

2. In an oil saver, a stuffing box in separable sections having a transverse passage between said sections for receiving a vertically reciprocable element, said box having closed ends and one open side and defining a chamber at each end, a packing element slidable in each of said chambers introduced through the open side of said box, a closure plate coextensive with said open side, a latch bar hinged at one end to one end of said box and latched at its other end to the opposite end of said box, a first means detachably connecting said closure plate to said latch bar, a second means threadedly passing through said latch bar and bearing against said closure plate to cause the same to compressively engage said packing elements and means at each end of said box for advancing said packing elements into frictional engagement with said reciprocable element.

3. In an oil saver, an elongate stuffing box in separable sections adapted to be joined together on opposite sides of a reciprocable element, said box having a chamber on opposite sides of said reciprocable element and an open side, a packing element adapted to be inserted into each of said chambers through said open side, a closure plate for said open side, a latch bar overlying said closure plate and hinged at one end to an end of said box and latched at its opposite end to the other end of said box means extending through said latch bar and bearing against said closure plate to cause the latter to compress said packing elements in their chambers, and means at each end of said box for advancing said packing elements into frictional engagement with said reciprocable element.

4. An oil saver comprising an elongate stuffing box having a passage therethrough for receiving a vertically reciprocable element, said box having a chamber on opposite sides of said passage and an opening coextensive with one side thereof, a packing element in each of said chambers, means at each end of said box for urging said packing elements frictionally against the reciprocable element moving in said passage, a closure plate for said coextensive opening, a latch bar extending longitudinally of said closure plate along its outer surface and hinged at one end to one end of said box and latched at its opposite end to the other end of said box, and means carried by said latch bar and bearing against said closure plate for exerting a compressive force on said packing elements.

5. An oil saver comprising a stuffing box having an open side, said box being in separable sections joined at their ends in longitudinal alignment, each section having a part formed on its upper and lower surface complementary to a corresponding part on the adjacent section, said parts defining a mounting member on the lower surface of said box and a tubular member on the upper surface of said box, said mounting and said tubular members each having a split bushing secured therein for engaging a vertically reciprocable member, a packing element in each of said sections, a closure plate coextenstive with the open side of said stuffing box, means carried by said closure plate for exerting a compressive force on said packing elements, comprising a latch bar to which said closure plate is attached and which is hingedly secured at one end to an end of said stuffing box and latched at the opposite end to the other end of said box, said bar having longitudinally spaced and threaded openings, bolts extending through said openings and bearing against said closure and means for rotating said bolts.

6. The structure of claim 5, said closure having longitudinally spaced spring clips, said spring clips clampingly engaging said latch bar.

References Cited in the file of this patent

UNITED STATES PATENTS

| 1,432,591 | Carll | Oct. 17, 1922 |
| 1,782,851 | Hoffman et al. | Nov. 25, 1930 |
| 1,986,283 | Penick et al. | Jan. 1, 1935 |
| 2,144,403 | Davidson | Jan. 17, 1939 |